A. W. BRICE AND I. E. BOOTH.

MACHINE FOR MARKING SHOE UPPERS.

APPLICATION FILED FEB. 15, 1919.

Reissued Oct. 26, 1920. 14,966.

6 SHEETS—SHEET 1.

INVENTORS:
Arthur W. Brice
Irving E. Booth
By their Attorney,
Nelson W. Howard

A. W. BRICE AND I. E. BOOTH.

MACHINE FOR MARKING SHOE UPPERS.

APPLICATION FILED FEB. 15, 1919.

Reissued Oct. 26, 1920.

14,966.

6 SHEETS—SHEET 2.

INVENTORS
Arthur W. Brice
Irving E. Booth
By their Attorney,
Nelson M. Howard

A. W. BRICE AND I. E. BOOTH.

MACHINE FOR MARKING SHOE UPPERS.

APPLICATION FILED FEB. 15, 1919.

Reissued Oct. 26, 1920.

14,966.

6 SHEETS—SHEET 3.

INVENTORS.
Arthur W. Brice
Irving E. Booth
By their Attorney,
Nelson W. Bonnell

A. W. BRICE AND I. E. BOOTH.

MACHINE FOR MARKING SHOE UPPERS.

APPLICATION FILED FEB. 15, 1919.

Reissued Oct. 26, 1920.

14,966.

6 SHEETS—SHEET 4.

INVENTORS.

Arthur W. Brice

Irving E. Booth

By their Attorney

Nelson W. Konrad

A. W. BRICE AND I. E. BOOTH.

MACHINE FOR MARKING SHOE UPPERS.

APPLICATION FILED FEB. 15, 1919.

Reissued Oct. 26, 1920. 14,966.

6 SHEETS—SHEET 5.

INVENTORS:
Arthur W. Brice
Irving E. Booth
By their Attorney,
Nelson W. Arnold

A. W. BRICE AND I. E. BOOTH.
MACHINE FOR MARKING SHOE UPPERS.
APPLICATION FILED FEB. 15, 1919.

Reissued Oct. 26, 1920. 14,966.

6 SHEETS—SHEET 6.

INVENTORS.
Ayton W. Brice
Irving E. Booth
By their Attorney,
Nelson H. Hendrick

UNITED STATES PATENT OFFICE.

ARTHUR W. BRICE AND IRVING E. BOOTH, OF ROCHESTER, NEW YORK, ASSIGNORS, BY MESNE ASSIGNMENTS, TO UNITED SHOE MACHINERY CORPORATION, OF PATERSON, NEW JERSEY, A CORPORATION OF NEW JERSEY.

MACHINE FOR MARKING SHOE-UPPERS.

14,966. Specification of Reissued Letters Patent. Reissued Oct. 26, 1920.

Original No. 1,278,842, dated September 17, 1918, Serial No. 92,296, filed April 19, 1916. Application for reissue filed February 15, 1919. Serial No. 277,359.

*To all whom it may concern:*

Be it known that we, ARTHUR W. BRICE and IRVING E. BOOTH, citizens of the United States, and residents of Rochester, in the county of Monroe and State of New York, have invented new and useful Improvements in Machines for Marking Shoe-Uppers, of which the following is a specification.

This invention relates to machines for marking shoe uppers and, more particularly, to machines for placing indication marks upon the material to designate locations for subsequent operations. The invention may be employed with particular advantage in marking buttonhole locations on shoe upper material and accordingly will be discussed particularly from this standpoint although, obviously as to its more general features, it has a broader field of application.

Buttonhole marking, as heretofore proposed and practised, has been accomplished by machines or by hand tools operating to mark the location of buttonholes or buttons on the shoe material by piercing, indenting or embossing the stock or by marking with ink or other color medium such as crayon or chalk.

Piercing, indenting and embossing are inadequate to accomplish the purpose, particularly with soft leather and cloth which is of a spongy and resilient nature, for the indication so formed disappears within a relatively short time after the material has been marked.

When ink is used on leather uppers it is readily blurred or smeared by the handling incidental to the work on the shoe before the buttonholes are to be made. With cloth upper material, there is not only the probability that the ink will be smeared but there is grave danger of the ink spreading and injuring the appearance of the upper. Chalk or crayon and similar color mediums of a dry nature are obviously liable to blur or rub off with the handling incidental to the manufacturing operation.

By the invention set forth in United States Letters Patent No. 1,198,462, issued September 19, 1916, on application of Richard L. Lloyd and Robert D. Simpson, there was provided for the first time mechanism for making indelible indication marks such as to be clearly discernible whatever the material marked, the machine disclosed in said Letters Patent being constructed and arranged to cauterize the surface of the material to be marked at the desired points by means of electrically heated marker elements.

The present invention provides novel and improved mechanism especially designed, without sacrifice of general utility, to be incorporated in a machine of the type set forth in said Letters Patent.

Conspicuous features of the present invention are found in an organization comprising an electrically heated marker element for shoe upper material and current controlling means therefor so constructed and arranged that the marker element may be normally heated to a relatively low temperature, preferably substantially below a quick cauterizing temperature for the given material, and operable to effect preferably substantially instantaneously an increase in the temperature of the marker element to a higher temperature (such as a quick cauterizing temperature) for the period of marking action of the marker element. Preferably the heat of the marker element will be increased just prior to engagement of the element with the material and the marking will be effected by a substantially momentary contact with the work.

A further feature of the invention consists, in combination with the cauterizing marker element, of current controlling means constructed and arranged for adjustment to provide varying normal and momentarily increased temperatures for the marker element. The cauterizing points of different shoe upper materials will vary and means for correspondingly varying the heated condition of the markers of the marker elements is a desideratum. A related feature of the invention consists, in combination with the current controlling means, of a series of markers carried by a series of marking members, and electrically connected in series.

The illustrated construction and arrangement are designed with a view especially to providing for maintaining the marker element normally and while it is inoperative at substantially the lowest temperature, having regard to the particular character of material to be operated upon, which will permit a substantially immediate increase to a quick and practically instantaneous cauterizing temperature for that material, preferably such as will cauterize the material upon substantially momentary contact.

Conspicuous advantages of this organization are that the temperature of the marker may be maintained normally at the most economical temperature and at a temperature low enough materially to prolong the life of the marker. This is of especial importance since in the use of the marker elements upon some materials, such as woolens and soft cottons, the markers tend to become coated with a carbon deposit which is likely to deteriorate the resistance element very rapidly if the markers are kept continuously at a high temperature. At the same time provision is made for an almost instantaneous increase in the temperature of the marker to a very quick and practically momentary cauterizing temperature which may be effected without excessive increase in the heating current, and the relatively high temperature during the period of contact of the marker element with the work minimizes the time of its contact with the work and thus insures against deterioration of the material marked, as by shrinkage, while effecting a sharp, clearly defined mark. This marking temperature will preferably be higher than the minimum temperature at which the material will cauterize and preferably high enough so that it will substantially more than compensate for any lowering of the temperature of the marker on contact with the material. Furthermore, the illustrative construction and arrangement provide adequately for regulation of the machine to accommodate it to the substantial variations in temperature necessary or desirable in view of the considerable variance of different materials operated upon.

Another feature of our invention consists in a construction of marking device providing a supporting arm with electrical connections and terminal contacts and a cauterizing head arranged to be detachably secured to the arm and including a length of resistance material forming the cauterizing marker and arranged for electrical connection with the arm terminal contacts when the head is secured to the arm. A related feature consists in providing, in the recited combination, a length of resistance material arranged for detachable connection with the cauterizing head and having portions arranged for circuit completing contact with the arm terminal contacts. Such an arrangement is obviously advantageous in that it provides for ready attachment and replacement of the cauterizing markers and in addition locates that portion of the electrical circuit of the arm which is more readily "burned out" at an easily accessible point. The cauterizing markers can thereby be readily replaced and attached after the analogy of electric bulbs in their sockets and the time and expense of replacement is minimized.

A further feature of the invention consists in a construction of marking device comprising opposed relatively movable arms carrying opposed marker elements of resistance material arranged simultaneously to engage opposite faces of the stock upon relative movement of the arms, thereby providing means for marking simultaneously a plurality of pieces of stock. A related feature consists in a plurality of such marking devices with series electrical connections for the markers. The described construction is particularly useful for marking buttonhole locations on shoe flies since it enables corresponding flies of the right and left shoes of a pair to be superposed and marked on similar sides in one marking operation. A related feature of the invention consists in a construction of marking device providing opposed relatively movable arms carrying opposed cauterizing markers with means to support the upper material between the markers and to prevent contact of the heated markers with the material until the arms are relatively moved to effect cauterization.

Another feature of our invention consists in the construction of marking device and support providing means for effecting sliding and swinging adjustment of the marker.

A further feature consists in a marking device having a hollow marking arm with a marking element of resistance material at one end of the arm and with electrical conductors extending through the arm to the marking element and insulated from the arm and from each other. This construction is advantageous in that the connections are protected from accidental injury and short circuiting through abrasion and displacement. A related feature consists in a marking device comprising a pair of opposed interconnected hollow arms arranged for relative movement and having marking elements of resistance material at their ends with insulated electrical conductors extending through the arms to the marking elements and with the conductors of the opposed arms electrically connected in series.

These and various other features will be more fully apparent from the following detailed description read in connection with the accompanying drawings in which, Figure 1 is a top plan view of a buttonhole marking machine equipped with a series of marking devices constructed and arranged to be electrically heated to cauterizing temperature in accordance with our invention;

Figure 2:
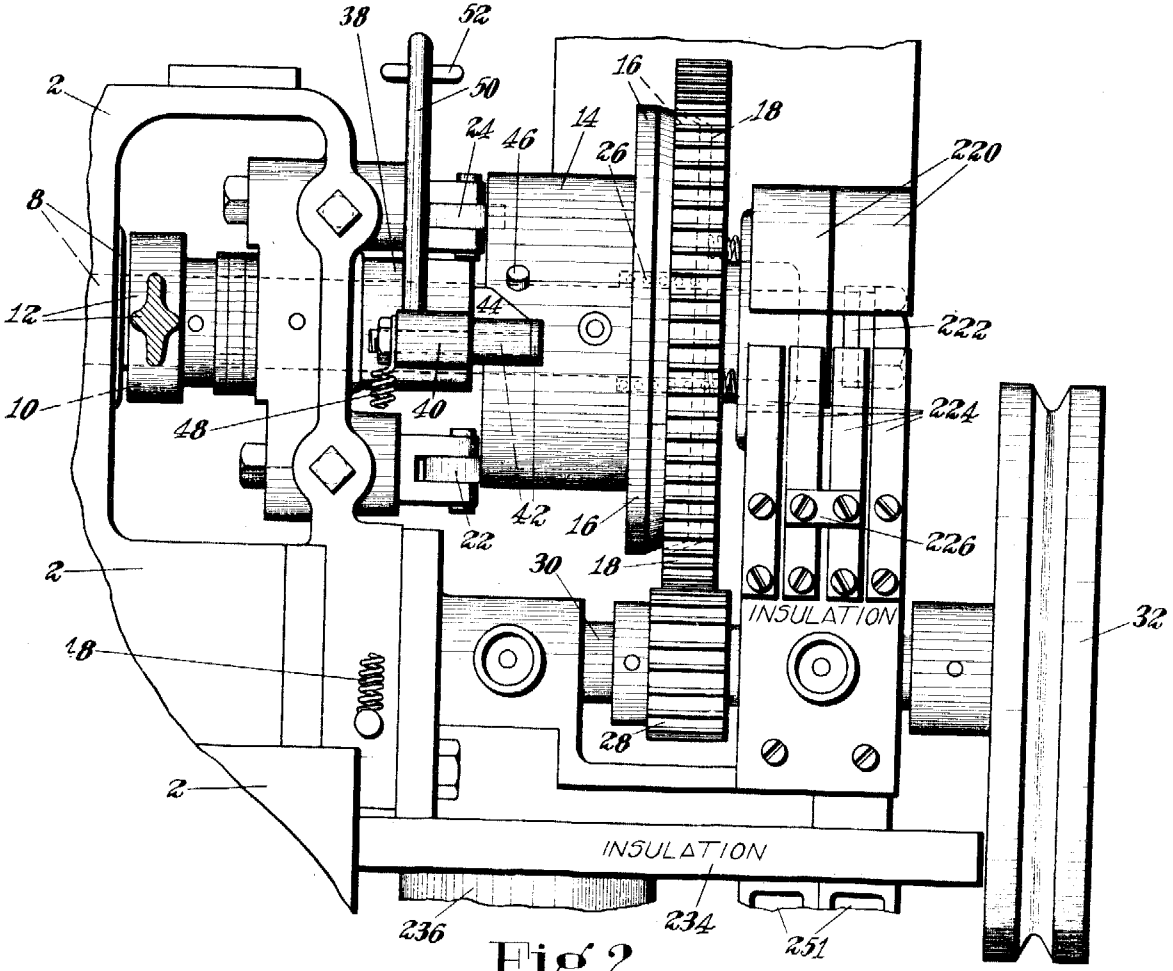
Fig. 2 is a plan view of the mechanism for driving the machine and for operating the automatic resistance cut-out switch for the rheostat.

A suitable bed 2 is provided with upwardly extending posts 4 upon which an operating head 6 is guided for vertical reciprocating movement toward and from the bed. A driven shaft 8 extends beneath the bed in the line of the operating head and is provided with eccentrics 10 (Fig. 2) having suitable straps 12 operatively connected with the head to reciprocate the head toward and from the machine bed when the shaft is rotated.

One end of the shaft extends out beyond the machine bed and has keyed thereon a sleeve 14 having at one end an annular clutch disk 16. A gear 18 is loosely journaled on the shaft 8 adjacent the clutch disk 16 and is provided with a coöperating clutch face. The inner face of the sleeve 14 is formed at diametrically opposite points with radially offset depressions, and rollers 22, 24 carried by and extending from the adjacent face of the machine bed are positioned to coöperate with and seat in these depressions. A coiled spring 26 is interposed between the gear 18 and the sleeve 14 and normally tends to force the sleeve in the direction of the rollers 22, 24 so as to hold the clutch disk 16 out of clutching engagement with the adjacent face of the gear 18.

The gear 18 is continuously driven by means of an intermeshing gear 28 mounted on a counter shaft 30 which carries a pulley 32 continuously driven through belt 34 from a suitable power source such as an electric motor 36. This motor and its circuit may be omitted, however, and the pulley 32 may be driven directly from a line shaft or other power source if desired.

When the shaft 8 and the operating head of the machine are at rest, the rollers 22, 24 will be seated in the depressions of the clutch sleeve with the clutch disk 16 out of clutching engagement with the gear 18. The shaft 8 may be given a single revolution and automatically stopped at the end of that revolution by throwing the clutch sleeve 14 into engagement with the rotating gear 18 whereupon the sleeve will be rotated to move the depressions past the rollers 22, 24 which will engage the relatively higher face of the sleeve and hold the sleeve in clutching engagement with the gear 18 until the depressions are again alined with their respective rollers. The coiled spring 26 (Fig. 2) will then force the clutch sleeve out of clutching engagement with the gear and the machine will be stopped with the operating head 6 at the limit of its upward movement. To move the clutch sleeve into engagement with gear 18, a sleeve 38 is loosely journaled on the shaft 8 adjacent to the inner edge of the clutch sleeve 14 and carries an upstanding arm 40. A finger 44 having a beveled edge is secured to arm 40 by the bolt 42 so as to lie in the plane of a stud 46 extending upwardly from the periphery of the sleeve. A coiled spring 48 is connected at one end to the machine bed and at its other end to the arm 40 and normally tends to pull the arm outwardly toward the front of the machine so that the beveled finger 44 is out of contact with the stud 46.

An offset 50 extends from the arm 40 rearwardly of the machine bed and is apertured at its rear end to receive the upper end of a treadle connected rod 52. When a suitably connected treadle (not shown) is operated to depress the rod, sleeve 38 will be turned to bring the beveled edge of finger 44 against the sleeve stud 46 to force said sleeve with its clutch disk 16 into engagement with the clutch face of the gear 18. The sleeve 14 will be rotated to move the depressions past the rollers 22, 24 which will thereupon operate to hold the sleeve clutch in driving connection with the gear 18 for one revolution of the shaft 8, as hereinbefore described. After the initial clutching action occurs the treadle may be released and the spring 48 will retract the arm 40 to its normally inoperative position.

The rotation of the shaft will move the operating head 6 vertically downward toward the machine bed and then return it vertically upward to normal inoperative position. Downward movement of the operating head engages simultaneously upper arms of a series of pivotally connected pairs of arms forming the marking devices and serves to effect relative movement between the upper and lower arms of the series of devices to mark work supported between the arms.

At the rear of the bed, the flanged heads of a series of studs 54 form a curved line.

Figure 3:
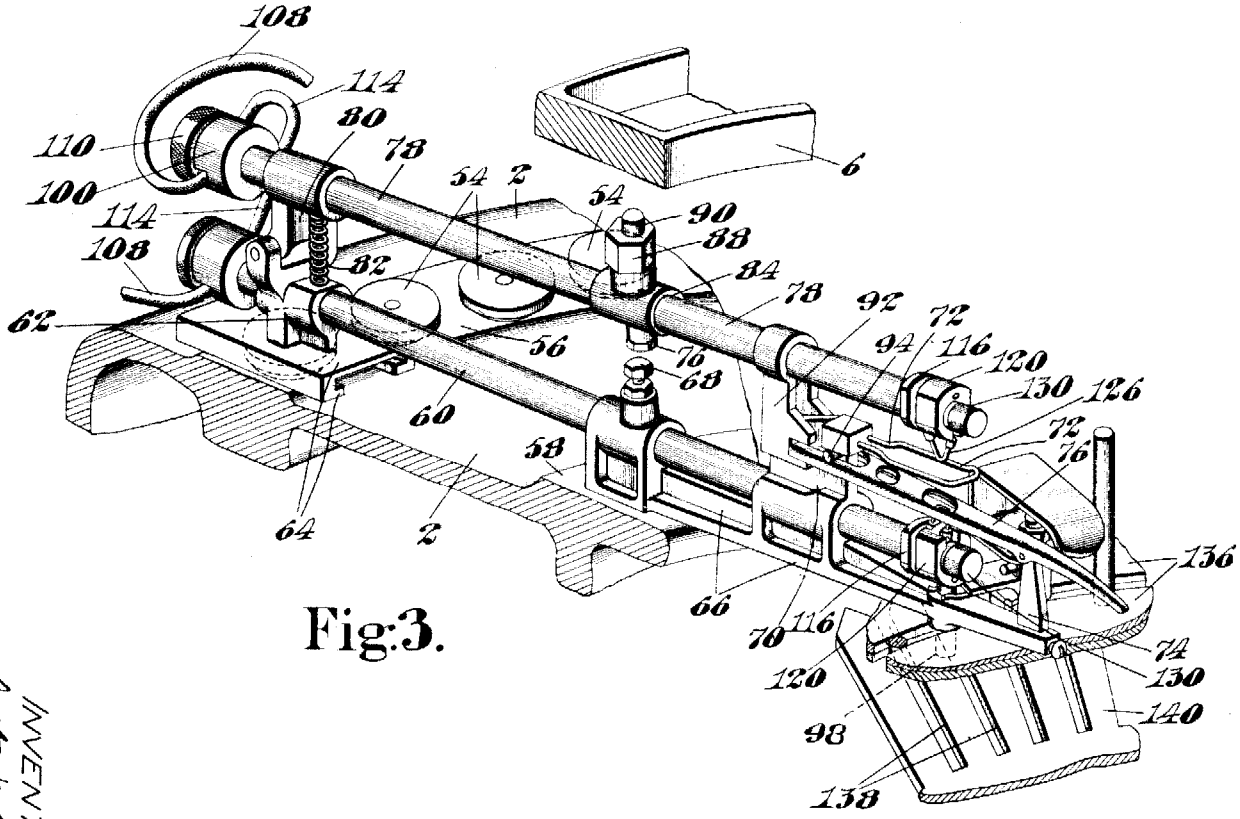
Fig. 3 is a perspective view of one pair of the electrically heated marking devices in position on the machine bed, this mechanism being shown as arranged to mark simultaneously on their respective upper and lower sides a pair of superposed shoe flies.

The bed of the machine in the line of these studs is formed with a raised bearing surface 56 and with a second raised bearing surface 58 (Fig. 3) similarly curved and spaced from the first bearing surface in the direction of the front of the machine bed. These bearing surfaces act as supports for the series of marking elements.

The pairs of arms forming the marking devices each include opposed electrically heated cauterizing markers and as illustrated are electrically connected in series. Structurally, they are duplicates, and accordingly, for the purposes of the present specification, only one device need be described in detail.

Each device includes a lower arm 60 mounted at its rear end on a base 62 including a channeled base plate 64 resting on the bearing surface 56 and engaging the flanged head of a stud 54 for swinging movement about said stud as a pivot and for sliding movement relatively to the stud. The forward end of the lower arm is carried in a frame 66, the rear portion of which normally rests upon the bearing surface 58 and is provided with an upwardly extending adjustable stop screw 68 to limit the movement of the upper arm toward the lower arm.

Intermediate of its ends the frame 66 is provided with a rib 70 and with a wire guard 72 extending forwardly therefrom to a point beyond and below the cauterizing wire marker of the upper arm, as hereinafter seen. The forward end of the frame detachably carries a post 74 upon which is pivoted a combined work supporting table and guard 76 at a point adjacent to its forward end, the rear end of the table being bifurcated to embrace the rib 70. This table acts as a support for the material to be marked and as a guard for the marker wire of the lower arm 60 and is provided with an aperture therein in line with the marker wire of the lower arm.

The upper arm 78 is carried at its rear end in the bracket 80 pivoted to the upper end of the base 62 of the lower arm. A coiled spring 82 interposed between the bracket 80 and the base 62 tends normally to separate the forward ends of the arms. At a point in line with the stop screw 68 of the lower arm, the upper arm is provided with a sleeve 84 having an abutment 86 to engage the stop screw, and having at its upper side an anvil 88 including a spring pressed contact plug 90 to cushion the impact of the operating head 6 against the anvil.

In line with the rib 70 of the lower arm, the upper arm is provided with depending spaced legs 92 embracing the rib and having their forward edges notched to receive loosely the bifurcated ends of the table 76. The action of the spring 82 normally tends to move the forward end of the upper arm upwardly to cause the legs 92 to swing the rear bifurcated ends of the table 76 upwardly, so as to position said table above the upper end of the lower marker wire. A stop pin 94 projects from the rib 70 to limit the upward movement of this end of the table.

Figure 4:
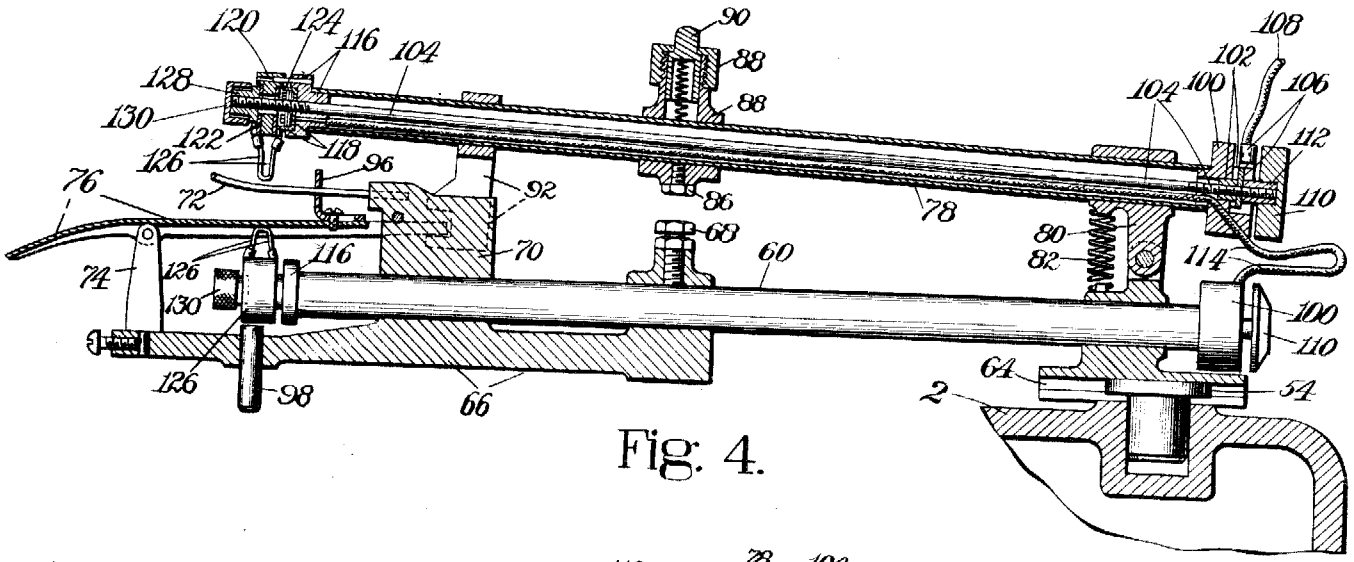
Fig. 4 is a longitudinal section through the marking device shown in Fig. 3.

Forwardly of the rib 70 and rearwardly of the ends of the arms, certain and centrally located tables 76 of the series of tables are provided with work edge gages in the form of angle plates 96 (Fig. 4) having slotted arms resting upon the table and adjustably secured thereto.

The series of marking devices or units are mounted for adjustment to vary their spacing and curvilinear arrangement. Adjusting mechanism of suitable construction may be used in coöperation with the units and their related parts. Accordingly, at the end of the lower marking arm, the frame 66 is provided with a guide pin 98, a portion of the pin projecting above the frame and a longer portion projecting below the frame for engagement with certain adjusting mechanism, hereinafter described and shown, generally, in Fig. 1 of the drawings.

Figure 5:
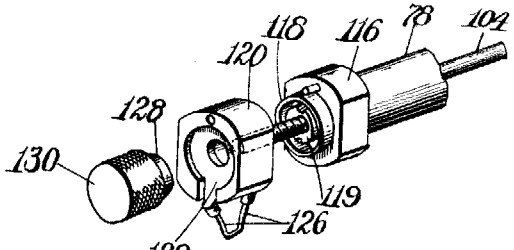
Fig. 5 is a detail of a cauterizing head and the coöperating marker parts.

The electric equipment of each arm of the series of upper and lower arms, is identical and, accordingly, a description of the specific construction of one arm only need be given. This construction is shown particularly in Fig. 4 of the drawings. Each of the upper and lower arms 60, 78 is in the form of a tube open at both ends. The electric connections enter at the rear of the tube, extend therethrough and connect at the front end with a detachable cauterizing marker head. Accordingly, taking the upper arm 78 shown in Figs. 4 and 5 as typical, it will be seen that in all the arms the rear of the arm is closed by a plug 100 of insulating material having an annular flange seating within the open rear end of the tube. This plug is centrally apertured to receive an interiorly threaded flanged sleeve 102 into and through which extends the rear threaded end of a conductor rod 104. The rear face of the plug 100 is recessed to receive a connector clip 106 seating against the flange of the sleeve 102 and over the rear threaded end of the rod 104. This clip is attached to the end of an insulated conducting wire 108 extending from the rear end of the lower arm of the next adjacent marking device (see Fig. 3) of the series and leading the current into the upper arm. The clip is held in contact with the sleeve and with the threaded end of the conductor rod 104 by means of a cap 110 of insulating material having a centrally disposed and interiorly threaded sleeve 112 screwing over the end of the rod 102 and against the clip. The plug 100, opposite the connector clip 106, is formed with a bore through which an insulated conductor wire 114 extends, this wire leading the current from the cauterizing element of the upper arm to the cauterizing element of the lower arm. Wire 114 and the conductor rod 104 are insulated from each other and form the positive and negative connections for the resistance element or cauterizing marker at the forward end of the arm.

The forward open end of the tube forming the upper arm is closed by a flanged plug 116 of insulating material, centrally apertured to enable the forward end of the rod 104 to extend therethrough, and having its outer face recessed to receive a contact ring 118 having a flange seating at the base of the recess. The insulated wire 114 extends through the tube to the plug 116 and from this point the wire, preferably with its insulating covering removed, extends through the insulating head and is electrically connected by soldering, or other wise, to the flange of the contact ring 118. This contact ring is formed with a central opening of sufficient size to insulate the ring from the portion of the rod 104 which extends therethrough. Preferably a washer 119 of insulating material is mounted on the rod within the ring to prevent the rod from engaging the ring flange. (See Fig. 4). The plug 116 carries a dowel pin, and a burner head in the form of a plug 120 of insulating material is formed with an aperture extending therethrough to receive the dowel pin so as to properly position the head relatively to the plug and to the electric connections projecting therefrom. The plug 120 is centrally apertured to permit the threaded end of the conductor rod 104 to extend therethrough without contacting with the burner head. The opposite faces of the plug 120 are recessed to receive contact plates 122, 124 centrally apertured to permit the end of the rod 104 to extend therethrough without contact. To the lower end of the clips 122, 124 on the upper marker arms (and to the upper ends of the corresponding clips on the lowering marking arms) is electrically connected by soldering or otherwise a loop 126 of electrical resistance material consisting of suitable relatively fine wire which is shaped at its lower or contact end to form a marking surface of desired configuration,—in the present case, a short relatively thin line to denote the buttonhole location.

The contact plates 122, 124 with their connected cauterizing wire loop 126 form in effect a spring clip which is detachably carried by the burner head 120 and which may be readily inserted in and removed from the burner head. The dowel aperture into the burner head extends entirely through the head and as the construction of the contact plates 122, 124, is identical, either contact plate may be at the inside of the insulating head and either face of the insulating head may be connected with the dowel pin of the plug 116.

When the burner head 120 with its contact plates 122, 124 and connected cauterizing wire loop is seated over the threaded outer end of the rod 104, the inner contact plate 122 or 124, as the case may be, will engage with the edge of the contact ring 118 which is connected with the leading-out wire 114. The extreme outer end of the rod will project beyond the burner head and will thread into a contact sleeve 128 carried within an insulated clamping nut 130, so that when the nut is screwed upon the outer end of the rod, its sleeve 128 will engage the outer contact plate 122, or 124 as the case may be, and will electrically connect the outer end of the rod 104, which forms the leading-in conductor, with said contact plate and will transmit the current through the cauterizing loop 126 of resistance wire to the opposite plate 122 or 124.

From this opposite plate the current will flow through the contact ring 118 and by wire 114 will be conducted from the upper marking arm to the intake side of the lower marker arm where it connects with similar conductors, contacts, cauterizing loop, etc., and from which the current is led out by an insulating wire (corresponding to the wire 114, Fig. 4) which extends from the lower arm of one unit (see wire 108, Fig. 3) to the conductor rod of the upper arm of the next adjacent unit of the series.

Figure 1:
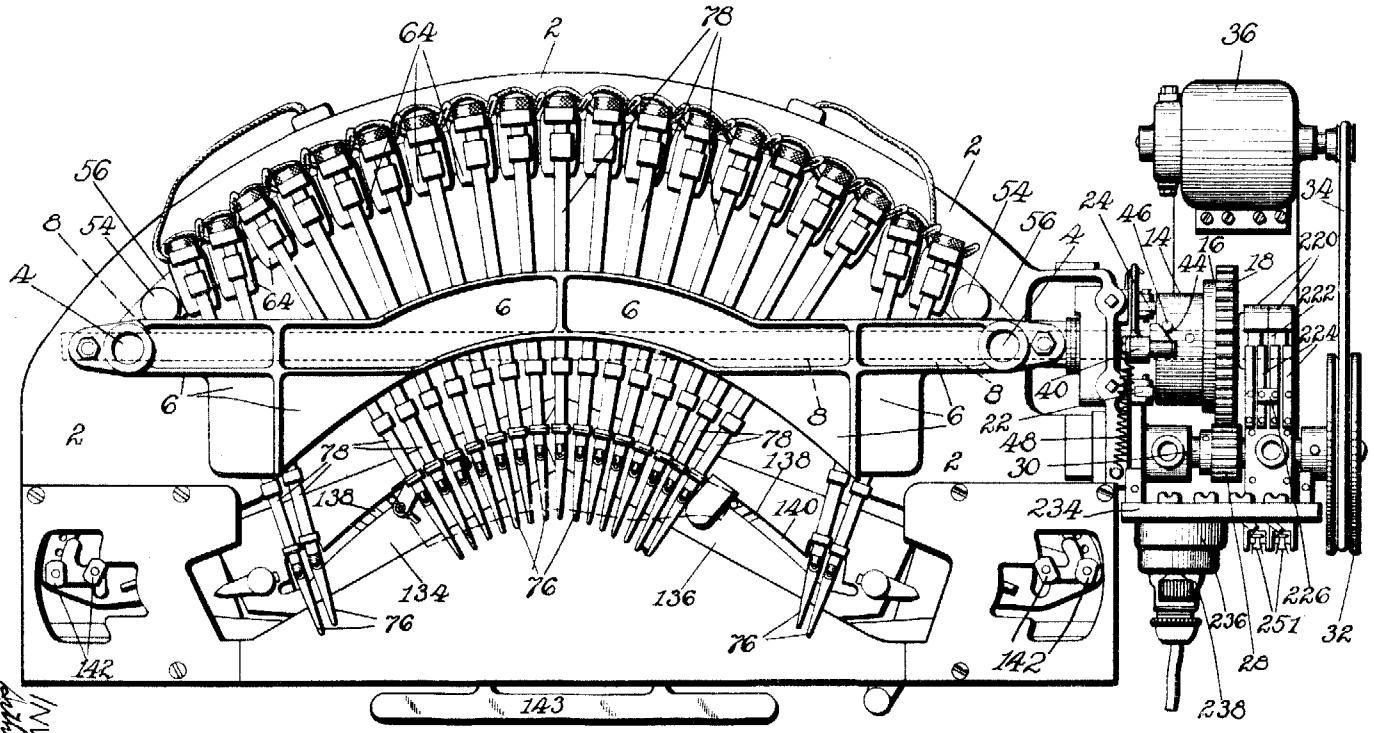

It will be seen from the foregoing that the cauterizing markers are electrically connected in series, the leads from the current source connecting with the opposite ends of these series (see Fig. 1). Before describing the current distribution and control, we will refer briefly to one form of marker element adjusting mechanism which may be advantageously employed and which forms the subject-matter of an application by William Hamann for machines for marking shoe uppers filed April 8, 1916, Serial No. 89,968.

It will be remembered that the lower arm of each marking device or unit is provided with a guiding pin 98. This adjusting mechanism, as disclosed in Fig. 1 of the drawings provides two complemental guide plates 134, 136 having their adjacent inner ends pivotally interconnected by means of the guide pin 98 of the central unit which is fixed against adjusting movement and relatively to which the other units are adjusted. These pivotally interconnected guide plates are provided with complemental curved guide slots therein through which the guiding pins 98 project. These guiding pins below the guide plates 134, 136, enter into and engage the sides of divergent spacing slots 138 in a reciprocating spacer plate 140. The outer ends of the pivoted guide plates 134, 136 are provided with suitable adjustment levers generically indicated at 142 for swinging the guide plates to vary the line of their curved guide slots. This adjusting movement will slide the units, or some of the units relatively to their pivot studs to vary the line of markers. When the spacer plate 140 is moved inwardly by suitable feed mechanism not illustrated specifically herein but which includes a spring motor drive and an escapement controlled by a hand-operated spacing bar 143 (Fig. 1), the marker arms will be swung on their pivot studs inwardly toward the central fixed marker arm and when the spacer plate is manually moved outwardly the reverse spacing movement takes place.

With such adjusting mechanism coöperating with our series of marking devices or units, the operation of the machine is as follows: Right and left buttonhole flies of the same pattern and size are superposed and are seated upon the series of tables 76 and the adjustment means operated until the markers have been properly positioned relatively to the work. The treadle rod 52 is then actuated to operate the one cycle clutch to cause the head 6 to be moved downwardly to effect relative movement between the opposed series of markers so as to bring these markers into contact with the surface of the work, as heretofore described, the parts being subsequently returned to inoperative positions at the end of one revolution of shaft 8.

According to our invention, the series of cauterizing wire loops 126 forming the markers, or marker elements, will be maintained at a uniform minimum heat during the times that the marker elements are inoperative, or in other words, are not being moved into work engaging positions. This minimum heat will be regulated through a suitable resistance or rheostat arrangement so that it will give the current requisite to heat the marker elements to a normal and relatively low temperature which may be quickly, and preferably almost instantaneously, raised by suitable, and preferably only substantially momentary, increase in the heating current to a substantially higher, and preferably quick, cauterizing temperature. This higher cauterizing temperature is preferably appreciably above the minimum cauterizing temperature for the material to be marked. Otherwise, the loss of heat through contact with said material will lower the temperature of the markers sufficiently to require a relatively prolonged period of cauterizing contact as contrasted with a substantially momentary contact at an appreciably higher temperature, the advantages of which have been previously set forth.

We have therefore provided means for automatically increasing the heat of the burners just prior to and during the actual marking operation, so that the loss of heat due to the burning action is, at least, compensated for, and the markers are maintained throughout the marking operation, at a cauterizing temperature. For descriptive purposes, we use direct current, the series of markers, electrically connected in series, being included in a circuit containing a rheostat having adjustable resistance, with a shunt circuit including connections to a resistance cut-out on the rheostat and an interposed switch normally open to break the shunt circuit but automatically closed by the operation of the machine for marking.

Before considering the system of current distribution and control, the rheostat and automatic switch construction will first be described.

Figure 6:
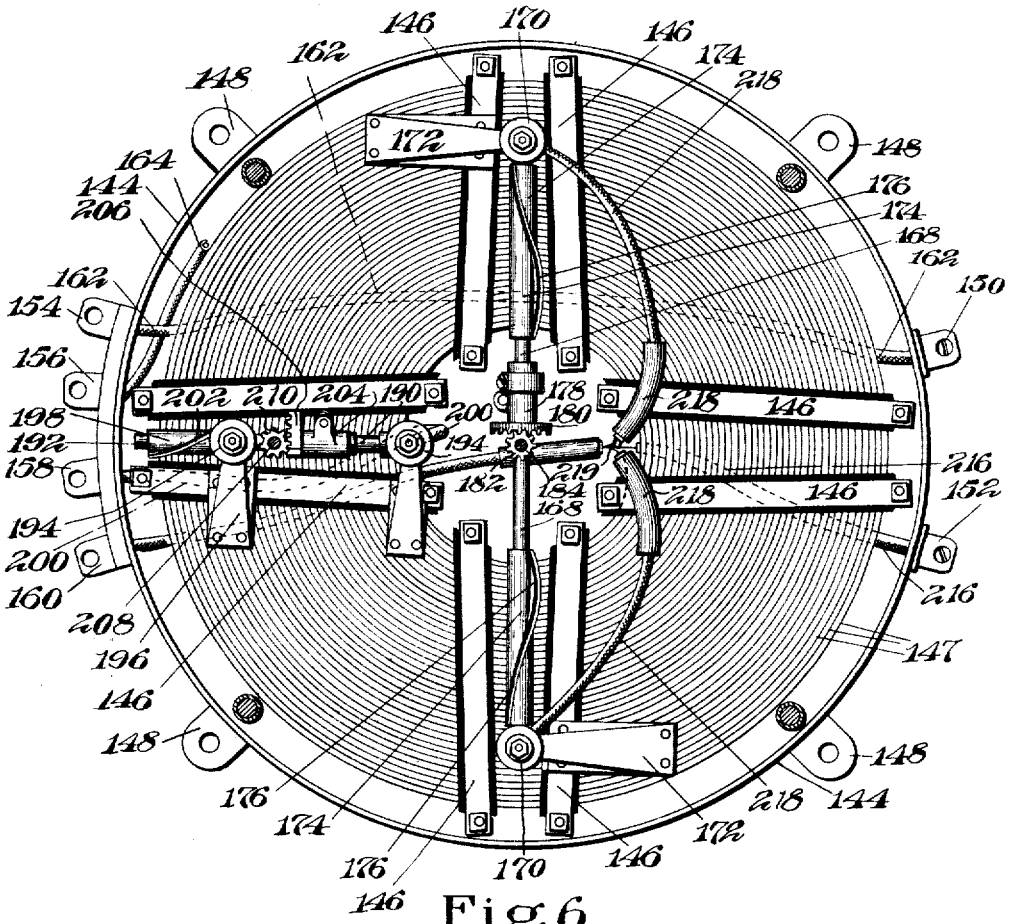
Fig. 6 is a plan view of a rheostat for controlling the heating circuit for the cauterizing marking elements, the casing being removed.
Figure 7:
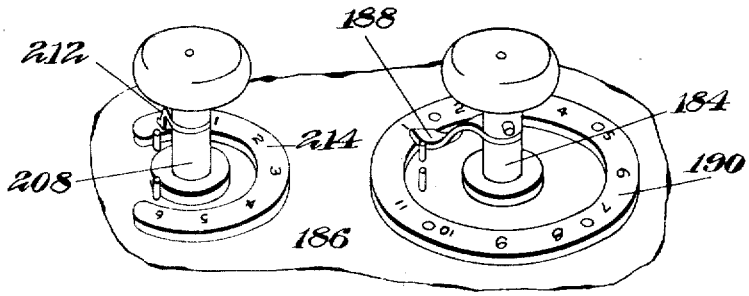
Fig. 7 is a fragmentary view of the casing top showing the resistance and cut-out adjusting handles with their indicator dials.

The rheostat is illustrated particularly in Figs. 6 and 7 of the drawings and includes a suitable casing 144 of circular form having an upper and lower (not shown) series of spaced grid bars 146 between which a spiral coil of electrically resistant material is supported, the bars being suitably insulated from the coil. This resistance coil is preferably in the form of a spirally wound ribbon 147 having a strip of insulating material, such as mica, wound between the different coils of the ribbon.

The casing 144 is provided with suitable feet 148 by means of which it may be secured to a desired support, and one side is provided with service current conductors 150, 152, and at the opposite side with heating circuit connections 154, 156, 158, 160. The connections 150 and 154 at opposite sides of the rheostat are directly connected by a suitable wire 162. From the outer end of the spiral resistance ribbon, as at 164, a suitable wire 166 leads directly to the outlet connection 156. The service connection 152 and the circuit connections 158, 160 are electrically connected with certain resistance cut-out mechanism which we will now describe.

Extending transversely of the casing 144 and centrally therethrough between and above spaced upper grid bars, is a rock shaft 168, the ends of which terminate adjacent to the outer edges of the rheostat frame and are carried in suitable journals 170. These journals are themselves supported by the ends of leaf spring arms 172 supported and extending upwardly from adjacent grid bars 146. The arms 172 normally tend to move the shaft in the direction of the edge of the resistance ribbon which is positioned below the shaft between the grid bars and the edge of which is exposed for electric contact.

Mounted on and fixed to the shaft 168 are spaced sleeves 174 which, through the shaft, are in electric connection with the journals 170 which in turn, are insulated from their supporting spring arms. These sleeves extend to points slightly beyond the inner end of the spiral resistance ribbon, and carry complemental spiral contact ribs 176 arranged for wiping contact with the ribbon edge and held in contact with the exposed edge of the resistance ribbon by means of the spring arms 172. When the shaft 168 is rotated the contact points of the complemental spiral ribs 176 with the exposed edge of the coil will move simultaneously and uniformly outward from the inner edge of the coil of resistance ribbon. We employ preferably two separate contact ribs in order to secure increased contact surface, although one sleeve and contact rib can be used if desired.

The shaft 168 at a central point has clamped thereto and insulated therefrom a sleeve 178 carrying at a point centrally of the shaft and casing a crown rack 180 designed to be oscillated by a suitable crown pinion 182 on a spindle 184 mounted in and carried by the top 186 of the rheostat casing (Fig. 7). The spindle will carry a suitable operating knob and a pointer 188 coöperating with a circular dial 190 on the casing top which will preferably have imprinted thereon a scale of the proportion or amount of the resistance cut-out by the contact points of the spiral ribs 176 at the point of adjustment of the shaft indicated by the pointer 188 on dial 190.

By operating the spindle 184 a portion of the coil of resistance material between the contact point of the spirals 176 and the inner end of the coil, is cut out of circuit, and this adjustment is utilized to provide a maximum resistance for the heating circuit and a minimum heat for the burners for any desired operation. As the temperature at which effective cauterization takes place varies with different materials, the desirability of adjustment is obvious.

At one side of the frame and at substantially right angles to the shaft 168, is mounted a stud shaft 192 in suitable journals 194 supported by and insulated from the free ends of leaf spring arms 196 supported and extending upwardly from a grid bar 146. Fixed on the outer end of the stud shaft and extending from the outer edge of the coil of ribbon 147 inwardly, for a distance which preferably is approximately but not fully the radial distance from the outer edge of the coil to the outermost contact point of the ribs 176, is a sleeve 198. The inner end of the sleeve is electrically connected through the shaft 192 with the journals 194 which, as before stated, are insulated from their supporting arms 196. From one journal connection a suitable wire 200 leads to the heating circuit connection 158. The sleeve 198 carries a spiral rib 202 arranged for wiping contact with the exposed upper edge of the resistance ribbon as the shaft 192 is oscillated, the contact point of the rib progressing from the outer edge of the resistance ribbon inwardly. When the shaft 168 has been oscillated to move the contact point of the spiral ribs 176 outwardly from the inner edge of the resistance coil, and when the shaft 192 has been oscillated to move the contact point of rib 202 inwardly from the outer edge of the coil of resistance ribbon, the interposed resistance, under certain controlled conditions of current distribution (*i. e.*, when the machine is operated to mark) will be limited to that portion of the resistance ribbon between the contact point of the ribs 176 and the contact point of the rib 202. Under another condition (with the machine inoperative) of current distribution and control, the resistance in the rheostat will be limited to that portion of the resistance ribbon between the outer end of the ribbon and the contact points of the spiral ribs 176 which move progressively from the inner end of the ribbon outwardly.

Similarly to the shaft 168, the stud shaft 192 is provided with a sleeve 204 carrying a crown rack 206 and a spindle 208 mounted in and depending from the top 186 carries a crown pinion 210 meshing with the rack 206. The spindle 208 carries a suitable pointer 212 coöperating with an annular dial plate 214 bearing indications similar to the indications upon the dial 190 and similarly designating the contact adjustment of the spiral rib 202.

The second current service connection is made at the connection 152 of the rheostat and thence extends by a suitable connecting wire 216 to the inner end of the coil of resistance ribbon (see Fig. 8) to which it is electrically connected as by soldering. The electric connections at the journals 170 are bridged by suitable wires 218, which wires are connected with the service current connecting wire 216 adjacent its point of connection to the inner end of the coil of resistance ribbon, as at 219, Figs. 6 and 8. When an electric motor 36 such as shown, is used to drive the pulley 32, it is included in the service circuit by extending the wire 216 across the rheostat and to the connection 160. If a motor 36 is not used, this extension of the wire 216, connection 160 and the motor circuit, may be omitted without affecting the heating circuit. In the diagrammatic showing in Fig. 8, the motor circuit is indicated in light lines and the heating circuit in heavy lines.

The automatic switch heretofore referred to is included in a shunt circuit with the spiral contact rib 202, the resistance ribbon and the terminal connection 158 of the spiral rib. This switch is by preference automatically operated through the movement of a machine part during a marking cycle of the driven shaft 8. In a preferred form, the switch comprises spaced metal disks 220 carried by and rotated with the driven shaft 8 when the one cycle clutch is operated, and insulated from each other and from the shaft. Alined portions of the peripheries of the disks are cut away to form an air gap 222, best seen in Figs. 1 and 2. A series of four spaced contact fingers 224 are mounted upon an insulating block on the bed of the machine and extend over and normally tend to engage the periphery of the spaced contact disks 220. The adjacent inner fingers are positioned to engage the periphery of opposite disks and have a bridging connection 226. The end finger 224 at one side of the series of fingers is connected, as by a wire 228 with the circuit connection 158 of the rheostat which, in turn is in connection with the spiral rib contact 202 which forms what may be called an auxiliary resistance cut-out.

Figure 8:
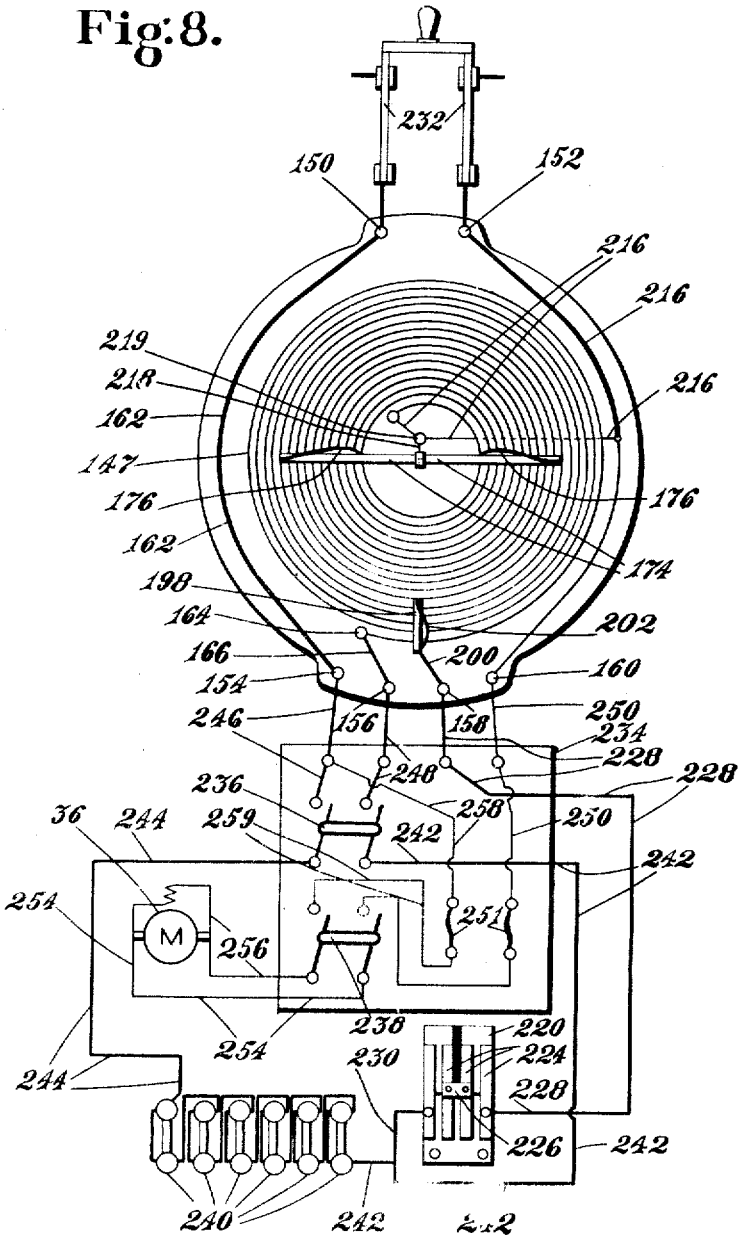
Fig. 8 is a diagrammatic view showing the heating circuits with the current distribution and control.

The opposite end finger is connected in shunt with the main heating circuit, as in Fig. 8.

When the machine is at rest, the ends of the fingers 224 will be positioned to extend into the air gap 222 and out of contact with the periphery of the spaced disks 220. When the treadle connected rod 52 is operated to throw in the clutch, the disks 220 will be rotated, the spring fingers 224 engaging the peripheries of the disks and a bridging connection 226 closing the circuit through the switch during the time that the fingers remain in contact with the disks. The closing of the circuit through the switch will, therefore, take place upon the initiation of the downward movement of the operating head 6 of the machine, and therefore, prior to the actual marking operation, and the circuit will be broken subsequent to the completion of the marking operation and prior to the time when the shaft 8 completes the single revolution which it receives through the one cycle clutch construction, heretofore described. The contact of the markers with the stock is only momentary but is of sufficient duration successfully to cauterize the material.

In Fig. 8 we have shown diagrammatically one system of current distribution, including the rheostat connections and the connections to the motor circuit. The parts in this diagrammatic view corresponding to the structural features and connections of the rheostat, heaters, switch, etc., are of course, indicated by similar numerals.

Referring to Fig. 8, it will be seen that a switch 232 is interposed in the service connection between the rheostat and the source of current supply and has its terminals connected by appropriate wires with the service current connectors 150 and 152 of the rheostat. Suitable switch connections are preferably inserted in the motor and heater circuits, these switches being shown in Figs. 1 and 2 as mounted upon a switch board 234, supported on the front of the machine bed providing a heater switch 236, and a motor switch 238 preferably with interposed fuses.

Referring to the diagrammatic showing, and assuming that the spindles 184 and 208 have been operated to adjust the spiral ribs 176 and 202 to positions of contact with the edges of the resistance coil in which portions of the coil at its inner and outer ends are cut out of circuit; the circuits will be as follows:

*Heating circuits.*—The current will pass from one side of the current source through service connection 152; thence by way of wire 216 and bridging connection 218 to the contact points of the spiral ribs 176 with the resistance coil; thence outwardly around through the coil to the contact point of the spiral rib 202, through the spiral rib and its sleeve and by way of connection 200 to the heating circuit connection 158; from this connection by wire 228 to an end finger 224 of the rotary switch (it being assumed that the machine is being operated and the circuit through the switch closed); thence through the switch and by wires 230 and 242 through the series of units 240; thence by a wire 244 to switch 236, through the switch 236 (assumed to be closed) and by wire 246 to the circuit terminal 154 of the rheostat, thence by wire 162 across the rheostat directly to the service connection 150 and from the service connection to the other side of the current source.

When the machine is at rest, and consequently when the shunt circuit, including the rotary switch and auxiliary cut-out formed by the spiral rib 202 is open, the current will pass from one side of the current source through service connection 152; thence by wire 216 and bridging connection 218 to the contact point of the spiral rib 176; thence through and around the resistance coil 147 outwardly to the outer terminal 164 of the coil and by wire connection 166 to the circuit terminal 156 of the rheostat; thence by wire connection 248 to the heater switch 236 (assumed to be closed) and by wire 242 from the heater switch, through the series of units 240 and by wire 244 back through the other side of the heater switch 236 and through wire 246, rheostat terminal 154 and return wire 162, to the rheostat service terminal 150 and to the opposite side of the circuit source.

*Motor circuit.*—When an electric motor is used for driving a machine, as we have illustrated and described herein, the motor circuit will branch off from the leading-in wire 216 as indicated in light lines and will connect with the circuit terminal 160 of the rheostat from whence it will extend by a suitable conductor 250 to one side of a switch 238, through the switch to one side of the motor 36 by wire 254; thence from the other side of the motor 36 through wire 256 through the other side of the switch 238; and thence by wire 258 to connect with the wire 246 of the heating circuit from which point the current flows back by wire 246 to rheostat contact 154, by return wire 162 to service connection 150 and thence through switch 232 to the opposite side of the current source. Suitable fuses 251 may be placed in the motor circuit.

Manifestly, the motor circuit may be operated entirely indepenedntly of the heating circuit and the motor circuit connections may also be entirely removed without interfering with the continued operation of the heating circuit.

The described constructions and arrangements for direct current service have been given as illustrative of the invention and for the purposes of description. It is contemplated that various other circuit and current controlling means and connections may be used for both direct and alternating current service within the purview of our invention. Accordingly, in the specification and claims, the terms "resistance", "rheostat", "shunt" and "shunt circuits" are used in their broadest sense. For example, the "resistance" may be ohmic, or inductive, or both and the "rheostat" may be of like character.

As we have before stated, different materials will burn or cauterize at different temperatures. The adjustment provided for by the described rheostat construction provides for variable heat points both as to normal heat and the increased heat during the marking operation. The specific construction of the rheostat constitutes the subject-matter of an application Serial No. 97,913, filed May 16, 1916, by Arthur W. Brice. Such features of the mechanical operating and adjusting mechanism of the disclosed machine as are not specifically described or specifically claimed as part of the present invention, constitute part of the inventions described and claimed in Letters Patent of the United States, No. 1,191,965, granted July 25, 1916, upon application of William Hamann and in the application filed by William Hamann April 8, 1916, Serial No. 89,968, respectively.

Having fully described our invention, what we claim as new and desire to secure by Letters Patent of the United States is:—

1. In a shoe upper marking machine, a marker element of electrical resistance material arranged to be heated to cauterizing temperature by the passage of an electric current, and an electric heating circuit for the marker element including means constructed and arranged to heat said element to a relatively low temperature and to produce an increase in the heat of the marking element effective during substantially the period said element is in contact with the work.

2. In a shoe upper marking machine, a marker element of electrical resistance material arranged to be heated to cauterizing temperature by the passage of an electric current, a work support, means for effecting relative movement between the marker element and work support to position the marker element to contact with the work, and an electric heating circuit for the marker element, including means arranged to provide a minimum heating current, with means operative to produce an increase in the heating current effective during substantially the period of contact of the element with the work.

3. In a shoe upper marking machine, a location marker element of electrical resistance material, an electrical heating circuit for said element, and current controlling means therefor constructed and arranged to provide for maintaining the marker element normally at a low temperature and to provide for raising the temperature of the marker element to the cauterizing temperature of the marker element for the period of contact of the marker element with the material to be marked.

4. In a shoe upper marking machine, a marker element of electrical resistance material, an electrical heating circuit for said element, and current controlling means therefor regulatable to provide for heating the marker element normally and operable to effect an increase in the temperature of the marker element sufficient for cauterization of the material to be marked.

5. In a shoe upper marking machine, a location marker element of electrical resistance material, an electrical heating circuit for said element including current controlling means therefor constructed and arranged to provide for heating the marker element normally at a selected temperature substantially below a quick cauterizing temperature for the given material and to provide for momentarily raising the temperature of the marker element to a quick cauterizing temperature for said material.

6. In a shoe upper marking machine, a marker element of electrical resistance material arranged to be heated to cauterizing temperature by the passage of an electric current, a work support, means for effecting relative movement between the marker element and work support to a position the marker element to engage the shoe material, and an electric heating circuit for the marker element, including an interposed resistance arranged for adjustment to provide a predetermined maximum resistance and minimum heating current, with means operative to produce a decrease in the resistance and a corresponding increase in the heating current effective during the period the marker element is positioned to contact with the shoe material.

7. In a shoe upper marking machine, a marker element of electrical resistance material arranged to be heated to cauterizing temperature by the passage of an electric current, a work support, means for effecting relative movement between the marker element and the work support to position the marker element to engage the shoe material, and an electric heating circuit for the marker element, including an interposed rheostat having means to provide variable maximum resistance with resultant minimum heating current and having means for reducing the resistance and correspondingly increasing the heating current operative upon relative movement between the marker element and work support.

8. In a shoe upper marking machine, a marker element of electrical resistance material arranged to be heated to cauterizing temperature by the passage of an electric current, a work support, means for effecting relative movement between the marker element and work support to position the marker element for contact with supported work, and an electric heating circuit for the marker element including means constructed and arranged to heat said element to a relatively low temperature and operative upon relative movement between the marker element and work support to produce an increase in the temperature of the marker element effective prior to and during the period said element is positioned for contact with the work.

9. In a shoe upper marking machine, a marker element of electrically resistant material arranged to be heated to cauterizing temperature by the passage of an electric current, a work support, means for effecting relative movement between the marker element and work support to position the marker element to engage the shoe material, and an electric heating circuit for the marker element including an interposed resistance arranged to provide a maximum resistance and minimum heating current, with means operative upon relative movement between the marker element and work support automatically to produce a decrease in the resistance and an increase in the heating current prior to and during the period the marker element is positioned to contact with the shoe material.

10. In a shoe upper marking machine, a marker element of electrically resistant material arranged to be heated to cauterizing temperature by the passage of an electric current, a work support, means for effecting relative movement between said support and said marker element to effect momentary contact of the marker element with the supported work, an electric heating circuit for said marker element including means constructed and arranged electrically to heat the marker element to a relatively low temperature while said marker element is inoperative and to produce an increase in the heat of the marker element effective during the period of its contact with the supported work.

11. In a shoe upper marking machine, a marker element of electrically resistant material arranged to be heated to cauterizing temperature by the passage of an electric current, a work support, means for effecting relative movement between said support and said marker element to effect momentary contact of the marker element with supported work, an electric heating circuit for said marker element including means for said marker element constructed and arranged electrically to heat the marker element to a relatively low temperature while said marker element is inoperative and automatically to produce an increase in the heat of the marker element upon relative movement of the support and marker element and prior to and during the period of its contact with the supported work.

12. In a shoe upper marking machine, a series of marking devices each having a marking member or element of electrically resistant material arranged to be heated to cauterizing temperature by the passage of an electric current, electrical connections between the series of marking members, a work support, means for effecting relative movement between said support and the series of marking devices to effect momentary contact of the marking members with the supported work, and an electric heating circuit for said marking members including means constructed and arranged electrically to heat the marking members to a relatively low temperature while said marking members are inoperative, and to produce an increase in the heat of the marking members effective during the period of contact with the supported work.

13. In a shoe upper marking machine, a marker element of electrically resistant material arranged to be heated to cauterizing temperature by the passage of an electric current, a work support, means for effecting relative movement between said support and marker element to effect momentary contact of the marker element with the supported work, an electric heating circuit for said marker element, including an interposed resistance arranged to provide a maximum resistance and minimum heating current, with means operative to produce a decrease in the resistance and an increase in the heating current effective during the period of contact of the marker element with the supported work.

14. In a shoe upper marking machine, a marker element of electrically resistant material arranged to be heated to cauterizing temperature by the passage of an electric current, a work support, means for effecting relative movement between said support and marker element to effect momentary contact of the marker element with the supported work, an electric heating circuit for said marker element, including an interposed resistance arranged for adjustment to provide a predetermined minimum heating current, with means operative automatically to produce a decrease in the resistance and a corresponding increase in the heating current effective during the period of contact of the marker element with the supported work.

15. In a shoe upper marking machine, a marker element of electrically resistant material arranged to be heated to cauterizing temperature by the passage of an electric current, a work support, means for effecting relative movement between said support and marker element to effect momentary contact of the marker element with the supported work, an electric heating circuit for said marker element, including an interposed rheostat having adjustment means determinately to vary the maximum resistance and minimum current for relatively low heat, with means arranged for adjustment determinately to decrease the resistance and operative by relative movement between the marker element and support automatically to produce a decrease in the resistance and an increase in the heating current effective during the period of momentary contact of the marker element and the work.

16. In a shoe upper marking machine, a series of marking devices each having a marker element of electrically resistant material arranged to be heated to cauterizing temperature by the passage of an electric current, electrical connections between the series of marker elements, a work support, means for effecting relative movement between the support and the series of marker elements to position said marker elements for contact with supported work, an electrical heating circuit including means constructed and arranged electrically to heat the marker elements of said series of elements to a relatively low temperature and automatically to produce an increase in the heat of the marker elements effective during the period said elements are positioned for contact with the work.

17. In a shoe upper marking machine, a series of marking devices each having a marker element of electrically resistant material arranged to be heated to cauterizing temperature by the passage of an electric current, electrical connections between the series of marker elements, a work support, means for effecting relative movement between the support and the series of marker elements to position said marker elements for contact with supported work, and electric heating circuit including means constructed and arranged electrically to heat the marker elements of said series of elements to a relatively low temperature and automatically to produce an increase in the heat of the marker elements effective during relative movement of the support and marker elements and prior to and during the period said elements are positioned for contact with the work.

18. In a shoe upper marking machine, a series of marking devices each having a marker element of electrically resistant material arranged to be heated to cauterizing temperature by the passage of an electric current, electrical connections between the series of marker elements, a work support, means for effecting relative movement between the support and the series of marker elements to position said marker elements for contact with supported work, an electric heating circuit including an interposed resistance arranged to provide a maximum resistance and a minimum heating current, with means operative automatically to produce a decrease in the resistance and a corresponding increase in the heating current effective during the period of contact of the marker elements with the supported work.

19. In a shoe upper marking machine, a series of marking devices each having a marker element of electrically resistant material arranged to be heated to cauterizing temperature by the passage of an electric current, electrical connections between the series of marker elements, a work support, means for effecting relative movement between the support and the series of marker elements to position said marker elements for contact with supported work, an electric heating circuit including a rheostat having adjustment means arranged to provide a predetermined maximum resistance and having means operative upon relative movement between the series of marker elements and the work support automatically to produce a decrease in the resistance and a corresponding increase in the heating current effective during the period of contact between the marker elements and the supported work.

20. In a shoe upper marking machine, a series of marking devices each having a marker element of electrically resistant material arranged to be heated to cauterizing temperature by the passage of an electric current, electrical connections between the series of marker elements, a work support, means for effecting relative movement between the support and the series of marker elements to position said marker elements for contact with supported work, an electric heating circuit including an interposed resistance arranged to provide a predetermined maximum resistance and minimum heating current, with a shunt circuit including said interposed resistance automatically closed by relative movement of the work support and markers momentarily to produce a decrease in the interposed resistance and a corresponding increase in the heating current effective during the period the marker elements are positioned for contact with the work.

21. In a shoe upper marking machine, a series of marking devices each having a marker element of electrically resistant material arranged to be heated to cauterizing temperature by the passage of electric current, series electrical connections between the series of marker elements, a work support, means for effecting relative movement between the support and the series of marker elements to position said marker elements for contact with supported work, an electric heating circuit including means constructed and arranged electrically to heat said series of elements to a relatively low temperature and automatically to produce an increase in the heat of the marker elements effective during the period said elements are positioned for contact with the work.

22. In a shoe upper marking machine, a series of marking devices each having a marker element of electrically resistant material arranged to be heated to cauterizing temperature by the passage of an electric current, said marker elements being electrically connected in series, a work support, means for effecting relative movement between the support and the series of marker elements to position said marker elements for contact with supported work, an electric heating circuit for the marker elements including an interposed resistance arranged for adjustment to provide predetermined maximum resistance with minimum heating current, and having means operative upon relative movement between the marker elements and work support automatically to produce a determinate decrease in the resistance and a corresponding increase in the heating circuit effective during the period of contact between the marker elements and the supported work.

23. An upper marking machine comprising, in combination, a marker element arranged to be electrically heated to cauterizing temperature, a work support, means for effecting relative movement between the marker element and said support to position the marker elements to engage the surface of supported work, including an intermittently operated rotary shaft and a reciprocating connection from said shaft, an electric heating circuit for said marker element including a resistance means providing a minimum current and normal heat for the marker element and a normally open shunt circuit in electrical connection with the resistance means and including a circuit closer operated through marker operating rotation of the shaft to close the shunt circuit and produce a reduction of the interposed resistance effective during the marking operation.

24. An upper marking machine comprising, in combination, a series of cauterizing marker elements arranged to be electrically heated and electrically interconnected, work supporting means, mechanism constructed and arranged to effect relative movement between the series of marker elements and the work supporting means to position the series of marker elements for contact with supported work, an electric heating circuit for the series of marker elements including a resistance element arranged determinately to provide a maximum resistance and a normal heating current, and a normally open shunt circuit in electrical connection with the resistance element and including a circuit closer actuated by marker-operating movement of said mechanism to close the shunt circuit to produce a reduction in the resistance offered by the resistance element and an increase in the heating current for the marker elements effective during the marking operation.

25. An upper marking machine comprising, in combination, a plurality of marker elements arranged to be electrically heated to cauterizing temperature and having electrical interconnections, work supporting means, mechanism constructed and arranged to effect relative movement between the plurality of marker elements and the supporting means to position the plurality of marker elements for contact with supported work and including an intermittently rotatable shaft and a reciprocating connection therefrom, an electric heating circuit for said plurality of marker elements including a rheostat providing a predetermined normal heating current, and a normally open shunt circuit in electrical connection with the rheostat and including a switch actuated by marker-operating rotation of the shaft to close the shunt circuit and automatically to produce a decrease in the rheostat resistance and an increase in the heat of the marker elements effective during the marking operation.

26. An upper marking machine comprising, in combination, a series of cauterizing marker elements arranged to be electrically heated and electrically interconnected, work supporting means, mechanism constructed and arranged to effect relative movement between the series of marker elements and the work supporting means to effect momentary contact of the marker elements with supported work, an electric heating current for the series of marker elements including a resistance element arranged determinately to provide a maximum resistance and a normal heating current, and a normally open shunt circuit in electrical connection with the resistance element to bridge a portion of the resistance for increasing the heating current and including a circuit closer actuated by marker-operating movement of said mechanism to close the shunt circuit to produce a reduction in the resistance offered by the resistance element and an increase in the heating current for the marker elements effective during the marking operation.

27. An upper marking machine having, in combination, a work supporting means, a series of cauterizing marker elements of resistance material mounted for movement toward said work supporting means and arranged to be electrically heated by the passage of an electric current, said series of marker elements being electrically interconnected, means to move said series of marker elements toward and from said work supporting means to position said markers for simultaneous contact with supported work, including an intermittently rotated shaft and a reciprocatory marker operating means operated by rotation of the shaft, an electric heating circuit for the series of cauterizing markers including a main circuit with an interposed resistance element providing a normal heating current with maximum resistance, and a normally open shunt circuit overlapping in part the main circuit and providing, when closed, a decreased resistance and increased heating current, a switch operated through said rotary shaft and arranged automatically to break said shunt circuit when the marker elements are inoperative and actuated by the rotation of the shaft automatically to close the shunt circuit to produce an increase in the heating current effective during the contact of the markers with the work.

28. An upper marking machine having, in combination, a work supporting means, a series of cauterizing marker elements of resistance material mounted for movement toward said work supporting means and arranged to be electrically heated by the passage of an electric current, said series of marker elements being electrically interconnected, means to move said series of marker elements toward and from said work supporting means to effect simultaneous and momentary contact of the markers with supported work, including an intermittently rotated shaft and a reciprocatory marker operating means operated by rotation of the shaft, an electric heating circuit for the series of cauterizing markers including a main circuit with an interposed resistance element providing a normal heating current with maximum resistance, and a normally open shunt circuit overlapping in part the main circuit and providing, when closed, a decreased resistance and increased heating current, a switch operated through said rotary shaft and arranged automatically to break said shunt circuit when the marker elements are inoperative and actuated by the rotation of the shaft automatically to close the shunt circuit to provide an increase in the heating current effective prior to and during the contact of the markers with the work.

29. An upper marking machine having, in combination, a work supporting means, a series of cauterizing marker elements of resistance material mounted for movement toward said work supporting means and arranged to be electrically heated by the passage of an electric current, said series of marker elements being electrically interconnected, means to move said series of marker elements toward and from said work supporting means to effect simultaneous and momentary contact of the markers with supported work including an intermittently rotated shaft and a reciprocatory marker operating means operated by rotation of the shaft, an electric heating circuit for the series of cauterizing markers including a main circuit with an interposed resistance element providing a normal heating current with maximum resistance, and a normally open shunt circuit overlapping in part the main circuit and providing, when closed, a decreased resistance and increased heating current, a rotary switch carried by and rotating with said shaft and arranged automatically to break said shunt circuit when the marker elements are inoperative and actuated by the rotation of the shaft automatically to close the shunt circuit to produce an increase in the heating current effective prior to and during the contact of the markers with the work.

30. In an upper marking machine, a marking device comprising an arm, insulated electrical conductors carried thereby having contact terminals, and a member detachably connected with the arm and carrying a cauterizing marker having circuit completing contacts arranged to engage said terminals when said member is attached to the arm.

31. In an upper marking machine, a marking device comprising an arm, insulated electric conductors extending longitudinally of the arm and having contact terminals adjacent to the end of the arm, and an insulating head arranged to be detachably secured to the end of the arm and carrying a cauterizing marker having circuit completing contacts arranged to engage said terminal contacts when the head is secured to the end of the arm.

32. In an upper marking machine, a marking device comprising an arm, insulated electrical conductors extending longitudinally of the arm and having contact terminals adjacent to the end of the arm, and an insulating head arranged to be detachably secured to the end, of the arm and having a detachable cauterizing marker with separate circuit completing contacts arranged to engage said terminal contacts when the head is secured to the end of the arm.

33. In an upper marking machine, a marking device comprising an arm, insulated electrical conductors carried thereby having contact terminals, and an insulating member detachably secured to said arm and carrying a cauterizing wire marker provided with contacts arranged to engage said contact terminals and complete the circuit when the insulating member is secured to the arm.

34. In an upper marking machine, a marking device comprising a hollow arm, insulated electrical conductors extending through said arm with contact terminals at the end of the arm, and an insulating head arranged to be connected to the end of the arm and having a cauterizing marker provided with contacts arranged to engage said contact terminals when the head is connected to the arm.

35. In an upper marking machine, a marking device comprising a tubular arm, positive and negative electrical conductors extending through the arm and insulated from each other and from the arm and with exposed terminal contacts, and a head of insulating material arranged to be detachably clamped to the end of the arm and carrying a cauterizing marker having circuit completing contacts arranged to electrically engage said terminals contacts when the head is clamped to the end of the arm.

36. In an upper marking machine, a marking device comprising a tubular arm, positive and negative electrical conductors extending through the arm and insulated from each other and from the arm and with exposed terminal contacts, and a head of insulating material arranged to be detachably clamped to the end of the arm and carrying a loop of resistance material forming a cauterizing marker and having separate circuit completing contacts electrically to engage said terminal contacts when the head is clamped to the end of the tubular arm.

37. In an upper marking machine, a marking device comprising a tubular arm, insulating plugs closing opposite ends of the arm, positive and negative electrical conductors extending through said plugs and through the arm and insulated from each other and from the arm, the terminal ends of said conductors extending through the plug at the end of the arm having exposed contact terminals, and a cauterizing head detachably connected with the plug and carrying a marker of resistance material having circuit completing contacts cooperating with the conductor contact terminals.

38. In a machine for marking shoe uppers, in combination, a work support and a marking member mounted for relative work-marking movement, a cauterizing marker comprising an individual strand of relatively fine wire carried by and outstanding from said member, and electrical connections on said member for the ends of said cauterizing marker.

39. In a machine for marking shoe uppers, in combination, a work support and a marking member mounted for relative work-marking movement, a cauterizing marker carried by and outstanding from said member and comprising a loop of relatively fine wire having its ends mounted on said member and provided with separate electrical contacts, and electrical connections on said member for said contacts.

40. In a machine for marking the locations of buttonholes on shoe uppers, in combination, a work support and a marking member mounted for relative work-marking movement, a cauterizing marker carried by said member formed of an individual strand of relatively fine wire projecting from said member and bent to form a relatively short linear contact surface to engage supported work, and electric circuit connections carried by the marking member for the ends of said cauterizing wire.

41. In a machine for marking the locations of buttonholes on shoe uppers, in combination, a work support and a marking member arranged for relative work-marking movement, said marking member having an outstanding loop of relatively fine wire providing a short linear cauterizing surface and having its ends mounted on said marking member and provided with spaced contact terminals, and electrical circuit connections for said terminals carried by said marking member.

42. In a machine for marking shoe uppers, in combination, a work support and a marking member arranged for relative work-marking movement, electric circuit connections carried by said member having terminal contacts, a head of insulating material carried by said marking member having complemental recesses therein, and a loop of relatively fine cauterizing wire extending from said head and having relatively large spaced ends seating in said recesses and in electrical connection with said terminal contacts.

43. In a machine for marking shoe uppers, in combination, a work support and a marking member arranged for relative work-marking movement, electric circuit connections carried by said member having terminal contacts, a block of insulating material attached to said member and having recesses in its opposite faces, and a loop of cauterizing wire having spaced terminal contact plates detachably seating in said recesses and in electrical connection with said circuit terminal contacts.

44. In an upper marking machine, a marking device comprising opposed arms carrying opposed markers constructed and arranged to be electrically heated to cauterizing temperature and to be electrically connected to a common current source and constructed and arranged to operate simultaneously upon a plurality of pieces of stock, with means to support shoe stock between the opposed markers.

45. In an upper marking machine, a marking device comprising opposed arms carrying opposed markers constructed and arranged to be electrically heated simultaneously to cauterizing temperature with series electrical connections between said markers and a common current source, and means to support shoe material between the opposed markers.

46. In an upper marking machine, a marking device comprising opposed arms provided with electrical conductors having terminal contacts and with detachable cauterizing markers having circuit completing contacts arranged to engage said terminal contacts and arranged to be heated to cauterizing temperature by the passage of an electric current therethrough, and means to support shoe material between the markers of the opposed arms.

47. In an upper marking machine, a marking device comprising opposed arms having bores extending therethrough with electrical conductors connected in series extending through said bores, and having exposed contact terminals, opposed markers of electrically resistant material detachably connected to said arms with circuit completing contacts arranged to engage said contact terminals, and means to support the shoe material between the opposed markers.

48. In an upper marking machine, a marking device comprising opposed arms carrying opposed markers constructed and arranged to be electrically heated to cauterizing temperature and to be electrically connected to a common current source, with means to support shoe material between the opposed markers and means to guard the material from the heated markers.

49. In an upper marking machine, a marking device comprising opposed arms carrying opposed markers constructed and arranged to be electrically heated to cauterizing temperature and to be electrically connected to a common current source, with means to support shoe material between the opposed markers and guards to prevent contact of the material with the markers arranged to be inoperatively positioned upon relative movement of the marker arms toward each other.

50. In an upper marking machine, a marking device comprising opposed upper and lower arms carrying opposed markers constructed and arranged to be electrically heated to cauterizing temperature, means to move the upper arm toward the lower arm, a fixed upper and a movable lower guard carried by the stationary lower arm to prevent contact of the work with the heated markers when in inoperative marking position, said guards having openings therethrough for the passage of the markers, with means to support work between the upper and lower markers and guards, and with means to move the lower guard to expose the lower marker upon downward movement of the upper marker through the opening of the upper guard.

51. In an upper marking machine, a marking device comprising opposed arms carrying opposed markers constructed and arranged to be electrically heated to cauterizing temperature and to be electrically connected to a common current source, with a combined work support and marker guard arranged to support work between the opposed markers and to expose a marker for contact with the work upon relative movement of the opposed arms.

52. In an upper marking machine, a marking device comprising opposed arms carrying opposed markers constructed and arranged to be electrically heated to cauterizing temperature and to be electrically connected to a common current source, with a combined work support and marker guard arranged to support work between the opposed markers and to expose a marker for contact with the work upon relative movement of the opposed arms and with work edge gaging means carried by said work support.

53. In an upper marking machine, a marking device comprising opposed arms carrying opposed markers constructed and arranged to be electrically heated to cauterizing temperature and to be electrically connected to a common current source, with a work supporting table having an opening in line with a marker and normally guarding the work from contact with said marker, but arranged to be moved by relative movement between the arms to cause the marker to extend through said opening to engage the supported work.

54. In a shoe upper marking machine, a marking device having a marker element of electrical resistance material arranged to be heated to cauterizing temperature by the passage of an electric current, a work support, means for effecting relative movement between the marker element and the work support to position the marker element to engage the shoe material and an electric circuit including the marker element arranged to provide a variable minimum heating current, with means operable automatically to produce an increase in the heating current effective during substantially the period the marker element is positioned to contact with the shoe material.

55. In a shoe upper marking machine, a marking device having a marker element of electrical resistance material arranged to be heated to cauterizing temperature by the passage of an electric current, a work support, means for effecting relative movement between the marker element and work support to position the marker element to engage the shoe material, and an electric circuit including the marker element having a resistance means arranged, upon relative marking movement between the marker element and work support, to produce an increase in the heating current for the marker element.

56. In a shoe upper marking machine, a marking device having a marker element of electrical resistance material arranged to be heated to cauterizing temperature by the passage of an electric current, a work support, means for effecting relative movement between the marker element and work support to position the marker element to engage the shoe material, and an electric circuit including the marker element having means arranged for adjustment to provide a determinate minimum heating current for the marker element and operative upon relative marking movement between the marker element and work support to produce an increase in the heating current effective during substantially the period the marker element is positioned for contact with the shoe material.

57. In a shoe upper marking machine, a marking device having a marker element of electrically resistant material arranged to be heated to cauterizing temperature by the passage of an electric current, a work support, means for effecting relative movement between said support and marker element to provide momentary contact of the marker element with the supported work, an electric circuit including said marker element and a resistance arranged to provide a determinate minimum heating current for the marker element with means operative automatically to increase the heating current for said element effective during the period of contact of the marker element with the supported shoe material.

58. In a shoe upper marking machine, a marking device having a marker element of electrical resistance material arranged to be heated to cauterizing temperature by the passage of an electric current, a work support, means for effecting relative movement between the marker element and work support to position the marker element to engage the shoe material, and an electric circuit including said marker element and resistance means arranged for adjustment to provide a predetermined maximum heating current for the marker element effective during substantially the period said element is positioned to engage the shoe material.

59. In a shoe upper marking machine, a marking device having a marker element of electrical resistance material arranged to be heated to cauterizing temperature by the passage of an electric current, a work support, means for effecting relative movement between the marker element and work support to position the marker element to engage the shoe material, and an electric circuit including the marker element and means arranged to provide a predetermined minimum heating current for the marker element and operative upon relative marking movement of the marker element and support determinately to increase the heating current for the marker element.

60. In a machine of the class described, a marking device carrying a marker element comprising electrical resistance material constructed and arranged to be heated to cauterizing temperature, and automatically actuated means effective to produce an increase in the heat of the marker element effective during engagement of the marker element with the work.

61. In a shoe upper marking machine, a marker element and means constructed and arranged to heat said element to a relatively low temperature and to produce an increase in the temperature of said element effective during substantially the period said element is in contact with the work.

62. In a shoe upper marking machine, a marker element, means to heat said marker element normally to a relatively low temperature, and means operative during the marking contact of said marker element and the work to maintain said marker element at a quick cauterizing temperature.

63. In a shoe upper marking machine, the combination of a marker element and means to heat said marker element to a quick cauterizing temperature at the time of the marking operation.

64. In a shoe upper marking machine, the combination of a marker element and means to control the temperature of said marker element in accordance with the position thereof.

65. In a shoe upper marking machine, the combination of a work support, a marker element, and means to control the temperature of said marker element in accordance with the relative position of said marker element and said work support.

66. In a shoe upper marking machine, the combination of a marker element formed of electric resistance material, a source of electric current therefor, and means for varying the heating effect of the electric current on the marker element in accordance with the position of the marker element.

67. In a shoe upper marking machine, a plurality of spaced, U-shaped buttonhole marking members of electric resistance material, a source of electric current for heating said members, and means to vary the spacing of said members.

In testimony whereof, we have signed our names to this specification.

ARTHUR W. BRICE.
IRVING E. BOOTH.

Corrections in Reissue Letters Patent No. 14,966.

It is hereby certified that in Reissue Letters Patent No. 14,966, granted September 17, 1918, upon the application of Arthur W. Brice and Irving E. Booth, of Rochester, New York, for an improvement in "Machines for Marking Shoe-Uppers," errors appear in the printed specification requiring correction as follows: Page 9, line 130, claim 6, strike out the article "a"; page 14, line 48, claim 35, for the word "terminals" read *terminal;* same page, line 60, claim 36, after the word "contacts" insert the word *arranged;* and that the said Letters Patent should be read with these corrections therein that the same may conform to the record of the case in the Patent Office.

Signed and sealed this 15th day of March, A. D., 1921.

[SEAL.] M. H. COULSTON,

*Commissioner of Patents.*

Cl. 219—19.